Figure 5:
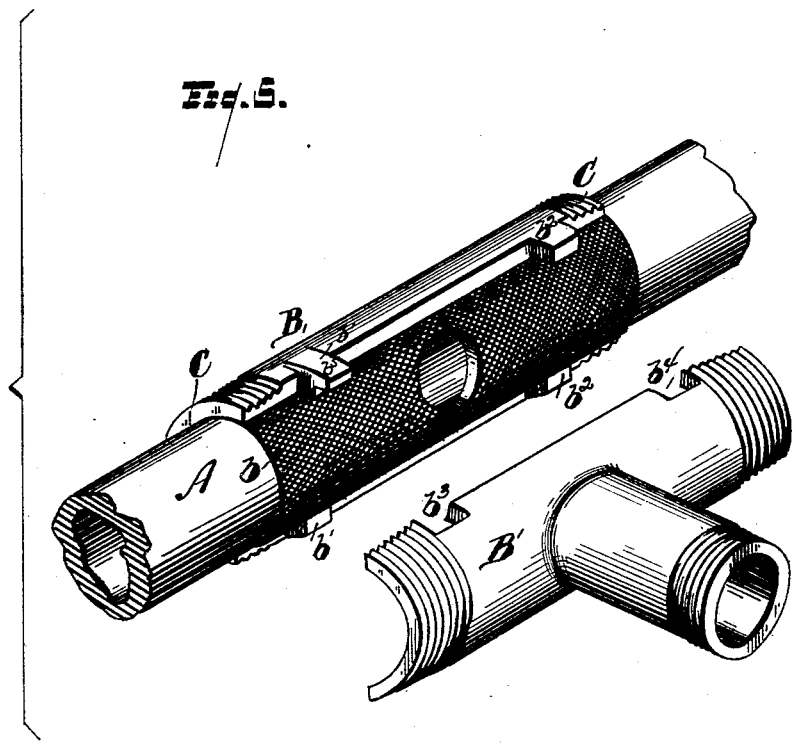

No. 625,448. Patented May 23, 1899.
L. JAENICHEN.
QUICK REPAIR DEVICE FOR PIPES.
(Application filed June 10, 1898.)
(No Model.) 2 Sheets—Sheet I.
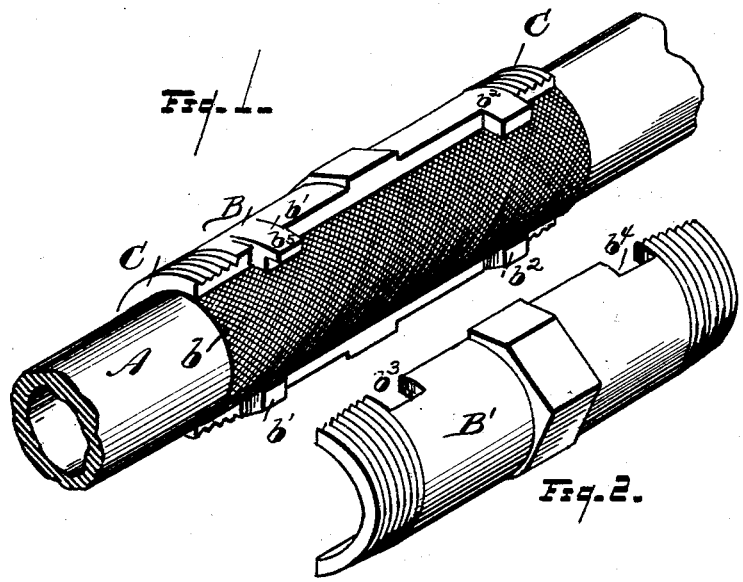
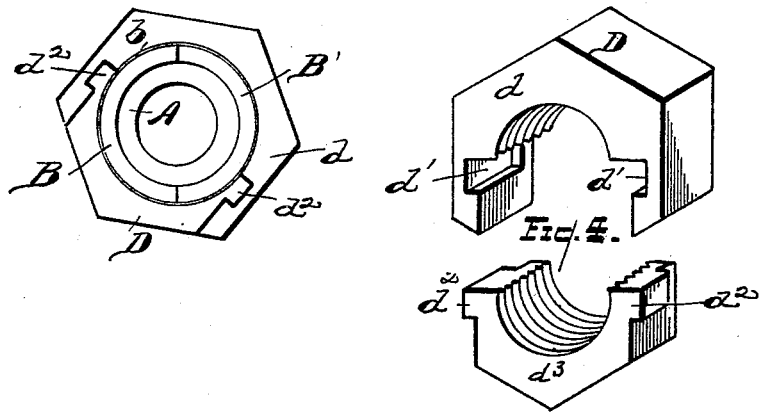
WITNESSES
Frank Duwe
Ler Auberg
INVENTOR
Louis Jaenichen
By Fisk & Thomas
Attys.

No. 625,448. Patented May 23, 1899.
L. JAENICHEN.
QUICK REPAIR DEVICE FOR PIPES.
(Application filed June 10, 1898.)
(No Model.) 2 Sheets—Sheet 2.

WITNESSES
Frank Duwe
Rose Orr

INVENTOR
Louis Jaenichen
By Fisk Thomas
Atty

UNITED STATES PATENT OFFICE.

LOUIS JAENICHEN, OF DETROIT, MICHIGAN.

QUICK-REPAIR DEVICE FOR PIPES.

SPECIFICATION forming part of Letters Patent No. 625,448, dated May 23, 1899.

Application filed June 10, 1898. Serial No. 683,055. (No model.)

*To all whom it may concern:*

Be it known that I, LOUIS JAENICHEN, a citizen of the United States, residing at Detroit, county of Wayne, State of Michigan, have invented a certain new and useful Improvement in Quick-Repair Devices for Pipes; and I declare the following to be a full, clear, and exact description of the invention, such as will enable others skilled in the art to which it pertains to make and use the same, reference being had to the accompanying drawings, which form a part of this specification.

My invention relates to improvements in quick-repair devices for conductor-pipes, and is shown in the accompanying drawings, in which—

Figure 1 is a perspective view showing the pipe and one part of the device in place thereon. Fig. 2 is a similar view showing the opposite part of the device. Fig. 3 is an end view of the device, and Fig. 4 is a view of one of the set-nuts taken apart. Fig. 5 represents the sleeve provided with a T, through which to tap the pipe without cutting.

In the drawings, A represents a section of iron conductor-pipe in which a leak has opened.

B and B' are the opposite halves of the sleeve for covering the leak, and when assembled have an interior diameter approximately the size of the pipe.

$b$ represents any suitable packing employed to make a steam or water tight joint.

The section B is shown as provided on the edge with lugs $b'$ and $b^3$, that register with corresponding recesses $b^3$ $b^4$ on the edge of the opposite part B'. These lugs and recesses act to bring the opposite parts to the same relative position whenever assembled. The lug $b'$ shows the variation of an overhanging edge $b^5$. The opposite ends of the sleeve are threaded, as shown at C and C', and the threaded portion is tapered, so that the nut in running onto the thread draws the opposite parts together with any required degree of force against the pipe.

The nuts D are made in two parts to adapt them to be engaged with the device when it is in position on the pipe. The two parts of the nut are dissimilar, the one, $d$, being the larger and adapted to embrace the thread or pipe and to extend to the farther side, having only so much of its body cut away as will allow it to pass over the pipe. The smaller part of the nut $d^3$ is only large enough to fill that part of the larger nut that is cut away, and it only extends to the center of the bore of the nut. The portion $d$ is provided with the interior recesses $d'$ $d'$ and the part $d^3$ with the exterior lugs $d^2$ $d^2$, which register one with the other to lock the nut together. To fix the position of the two parts relative to one another and to provide for lining up the thread, the recesses and lugs are cut short of the depth of the nut, and thus form a stop one for the other.

The sleeve is provided with means with which a wrench may be engaged to prevent it from turning when the nuts are run on. One half may be provided with a T, if desired, to provide means for tapping a pipe conveniently without cutting, as shown in Fig. 5. When such a form is used, the device is engaged with the pipe and the pipe then drilled through the T.

To put the device in position, the opposite parts of the sleeve are placed over the leak and the nuts assembled and run onto the threads at the ends until the device grips the pipe with sufficient force to stop the leak.

While I prefer to make the incline between the nuts and the sleeve on the sleeve, the thread on the sleeve may be cut straight and the nut inclined, the purpose of the construction being to draw the parts of the sleeve together as the nuts are run on.

My construction is equally applicable to separable sleeves for shafting as a means for attaching pulleys or making joints.

What I claim is—

1. A separable nut consisting of the larger portion $d$ and the smaller portion $d^3$ substantially as described.

2. In a quick-repair device for pipes, the combination of a divided and separable sleeve provided with a pipe connection, means for fixing the relative portions of the parts of the sleeve, said sleeves provided at their ends with a tapering thread, and the divided nuts provided with means for fixing the relative position of the parts of the nuts when assembled, whereby the threads on the respective parts of the device are in position to engage when the whole is assembled, substantially as described.

3. A separable nut consisting of the two portions one provided with interior recesses and the other with exterior lugs substantially as and for the purpose described.

4. A separable nut consisting of the two portions one provided with interior recesses and the other with exterior lugs, said recesses and lugs extending part way through the nut substantially as described.

In testimony whereof I sign this specification in the presence of two witnesses.

LOUIS JAENICHEN.

Witnesses:
S. E. THOMAS,
FRANK DUWE.